United States Patent [19]
Poss

[11] Patent Number: 6,163,420
[45] Date of Patent: Dec. 19, 2000

[54] INTERLEAVED ANALOG TRACKING TIMING AND GAIN FEEDBACK LOOPS FOR PARTIAL RESPONSE MAXIMUM LIKELIHOOD (PRML) DATA DETECTION FOR DIRECT ACCESS STORAGE DEVICE (DASD)

[75] Inventor: Joe M. Poss, Rochester, Minn.

[73] Assignee: International Business Machines Corporation, Armonk, N.Y.

[21] Appl. No.: 09/156,020

[22] Filed: Sep. 17, 1998

[51] Int. Cl.[7] .................................................. G11B 5/09
[52] U.S. Cl. ........................ 360/46; 360/51; 375/345; 375/362
[58] Field of Search .................. 360/51, 46, 65, 360/67; 375/345, 362, 355, 344, 341, 262, 232

[56] References Cited

U.S. PATENT DOCUMENTS

| | | | |
|---|---|---|---|
| 5,424,881 | 6/1995 | Behrens et al. | 360/40 |
| 5,459,757 | 10/1995 | Minuhin et al. | 375/376 |
| 5,521,945 | 5/1996 | Knudson | 360/65 X |
| 5,729,396 | 3/1998 | Dudley et al. | 360/41 |
| 5,796,358 | 8/1998 | Shih et al. | 341/139 |
| 6,005,729 | 12/1999 | Poss | 360/51 |
| 6,005,730 | 12/1999 | Poss | 360/51 |

OTHER PUBLICATIONS

IBM Patent Application R0997–051, "Low Power Analog Signal Processing Circuit", By Joe M. Poss, Ser. No. 08/891,517 filed Jul. 11, 1997.

IBM Patent Application R0997–052, "Analog Signal Processing Circuit with Integrated Gain and Timing Error Signal Processing", By Joe M. Poss Ser. No. 08/891,378 filed Jul. 11, 1997.

IBM Patent Application R0997–053, "Signal Error Generating Circuit for an Analog Signal Processing Channel", By Joe M. Poss Ser. No. 08/891,489 filed Jul. 11, 1997.

*Primary Examiner*—Alan T. Faber
*Attorney, Agent, or Firm*—Joan Pennington

[57] ABSTRACT

A high speed analog timing and gain feedback control methods and a low power analog tracking timing and gain feedback apparatus are provided for data detection, such as, partial-response maximum-likelihood (PRML) data detection in a direct access storage device (DASD). The interleaved gain and timing tracking control circuit includes an even interleave gain and timing tracking control providing an even interleave gain error signal and an even interleave timing error signal; and an odd interleave gain and timing tracking control providing an odd interleave gain error signal and an odd interleave timing error signal. The even interleave gain error signal and the odd interleave gain error signal are combined to provide a resulting gain control signal. The even interleave timing error signal and the odd interleave timing error signal are combined to provide a resulting timing control signal. The resulting gain control signal is applied to a variable gain amplifier and the resulting timing control signal is applied to a variable clock circuit in a data channel of a direct access storage device (DASD).

16 Claims, 10 Drawing Sheets

EVEN INTERLEAVE SEQUENCING

|       | k-14     | k-12     | k-10     | k-8      | k-6      | k-4      |
|-------|----------|----------|----------|----------|----------|----------|
| S/H 0 | TRACKING | Ek-8     | Ek-6     | Ek-4     | TRACKING | Ek-8     |
| S/H 2 | Ek-4     | TRACKING | Ek-8     | Ek-6     | Ek-4     | TRACKING |
| S/H 4 | Ek-6     | Ek-4     | TRACKING | Ek-8     | Ek-6     | Ek-4     |
| S/H 6 | Ek-8     | Ek-6     | Ek-4     | TRACKING | Ek-8     | Ek-6     |

FIG.5

ODD INTERLEAVE SEQUENCING

|      | k-14     | k-12     | k-10     | k-8      | k-6      | k-4      |
|------|----------|----------|----------|----------|----------|----------|
| S/H 1 | TRACKING | Ek-9     | Ek-7     | Ek-5     | TRACKING | Ek-9     |
| S/H 3 | Ek-5     | TRACKING | Ek-9     | Ek-7     | Ek-5     | TRACKING |
| S/H 5 | Ek-7     | Ek-5     | TRACKING | Ek-9     | Ek-7     | Ek-5     |
| S/H 7 | Ek-9     | Ek-7     | Ek-5     | TRACKING | Ek-9     | Ek-7     |

FIG.6

INTERLEAVED ANALOG TRACKING TIMING AND GAIN FEEDBACK LOOPS FOR PARTIAL RESPONSE MAXIMUM LIKELIHOOD (PRML) DATA DETECTION FOR DIRECT ACCESS STORAGE DEVICE (DASD)

FIELD OF THE INVENTION

The invention relates generally to data detection methods and apparatus, and more particularly to timing and gain feedback control methods and analog tracking timing and gain feedback apparatus for data detection, such as partial-response maximum-likelihood (PRML) data detection in a direct access storage device (DASD).

DESCRIPTION OF THE RELATED ART

Partial-response signaling with maximum-likelihood sequence detection techniques are known for digital data communication and recording applications. Achievement of high-data density and high-data rates has resulted in the use of a PRML channel for writing and reading digital data on the disks.

Analog signal processing circuits such as those used to process analog signals read by disk drive transducer heads from magnetic disks typically use feedback or decision aided gain and timing control to control tracking of the recorded data. Many known data detection channels including PRML channels employ a variable gain amplifier in the channel for amplification of the analog disk signal and a variable clock oscillator for controlling the synchronization of the analog disk signal sampling. In order to maintain accurate signal tracking of the channel in tracking mode, a gain error signal is developed from the analog disk signal to control the amplifier gain, and a timing error signal is developed from the analog disk signal to control the oscillator frequency. Typical timing and gain error circuits directly process the analog disk signal.

FIG. 2 is a block diagram of a prior art PRML data channel including a typical timing and gain control. The timing and gain control keeps a variable controlled oscillator (VCO) and a variable gain amplifier (VGA) at the correct operating conditions while reading data from the disk. The system clock from the vco is a full rate clock signal. The full rate clock signal equals the data rate multiplied by a coding factor.

As channel speeds go faster, conventional arrangements of circuit functions can be a limiting factor in overall performance. In the design of new DASDS, the performance requirements can be more demanding than the channel can deliver with traditional architectures.

A need exists for improved, high speed, low power analog tracking timing and gain feedback control for a recording channel.

SUMMARY OF THE INVENTION

A principal object of the present invention is to provide improved, high speed, low power analog timing and gain feedback control methods and analog tracking timing and gain feedback apparatus for data detection, such as, partial-response maximum-likelihood (PRML) data detection in a direct access storage device (DASD). Other important objects of the present invention are to provide such methods and apparatus substantially without negative effects; and to provide such methods and apparatus that overcome some of the disadvantages of prior art arrangements.

In brief, high speed, low power analog timing and gain feedback control methods and analog tracking timing and gain feedback apparatus are provided for data detection, such as, partial-response maximum-likelihood (PRML) data detection in a direct access storage device (DASD). The interleaved gain and timing tracking control circuit includes an even interleave gain and timing tracking control providing an even interleave gain error signal and an even interleave timing error signal; and an odd interleave gain and timing tracking control providing an odd interleave gain error signal and an odd interleave timing error signal. The even interleave gain error signal and the odd interleave gain error signal are combined to provide a resulting gain control signal. The even interleave timing error signal and the odd interleave timing error signal are combined to provide a resulting timing control signal.

In accordance with features of the invention, the resulting gain control signal is applied to a variable gain amplifier and the resulting timing control signal is applied to a variable clock circuit in a data channel of a direct access storage device (DASD).

BRIEF DESCRIPTION OF THE DRAWINGS

The present invention together with the above and other objects and advantages may best be understood from the following detailed description of the preferred embodiments of the invention illustrated in the drawings, wherein:

FIGS. 5 and 6 are charts respectively illustrating even interleave sequencing and odd interleave sequencing in accordance with the present invention;

DETAILED DESCRIPTION OF THE PREFERRED EMBODIMENTS

Figure 1:
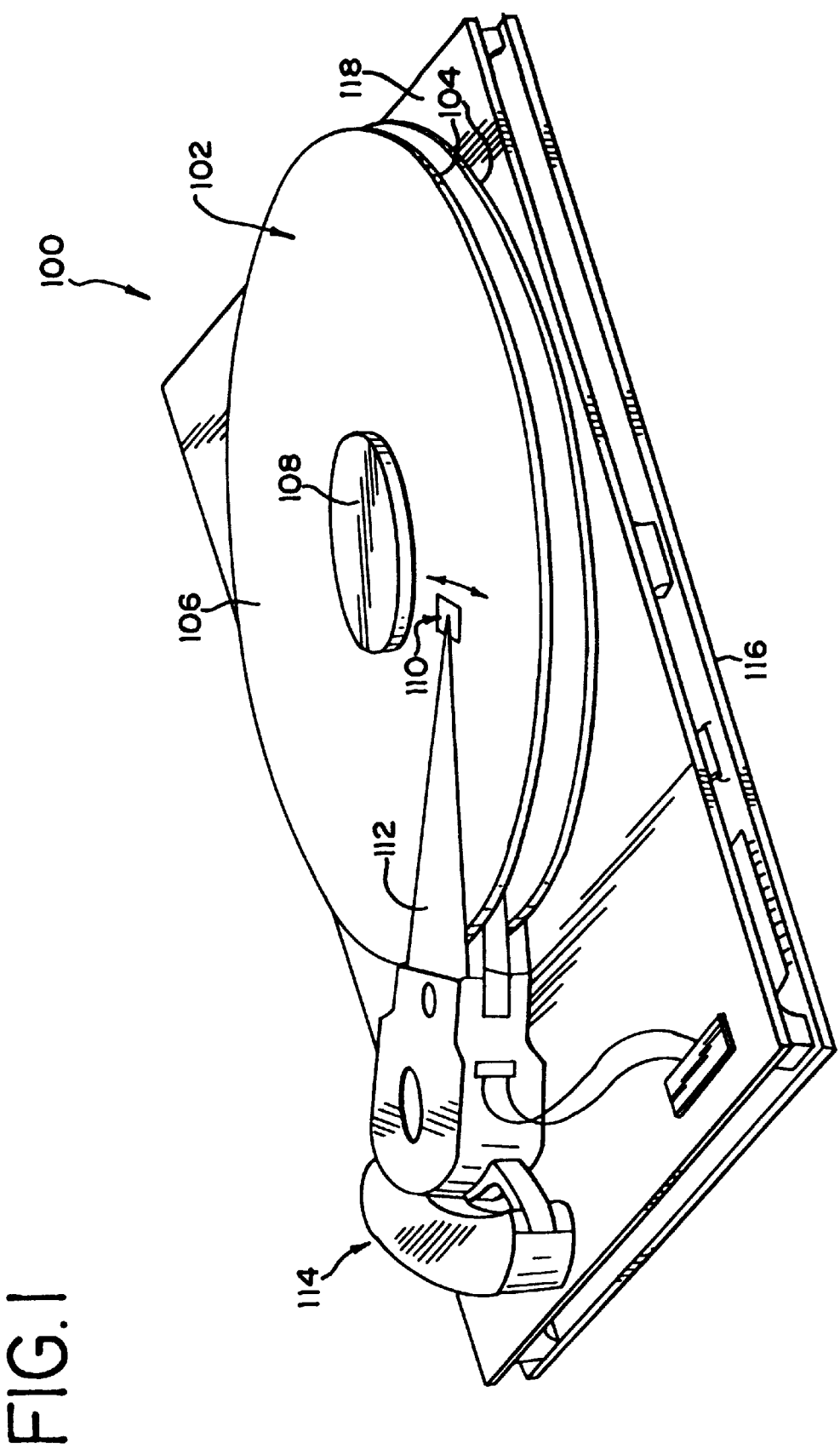
FIG. 1 is a diagrammatic view of a direct access storage device (DASD) embodying the present invention.
Figure 2:
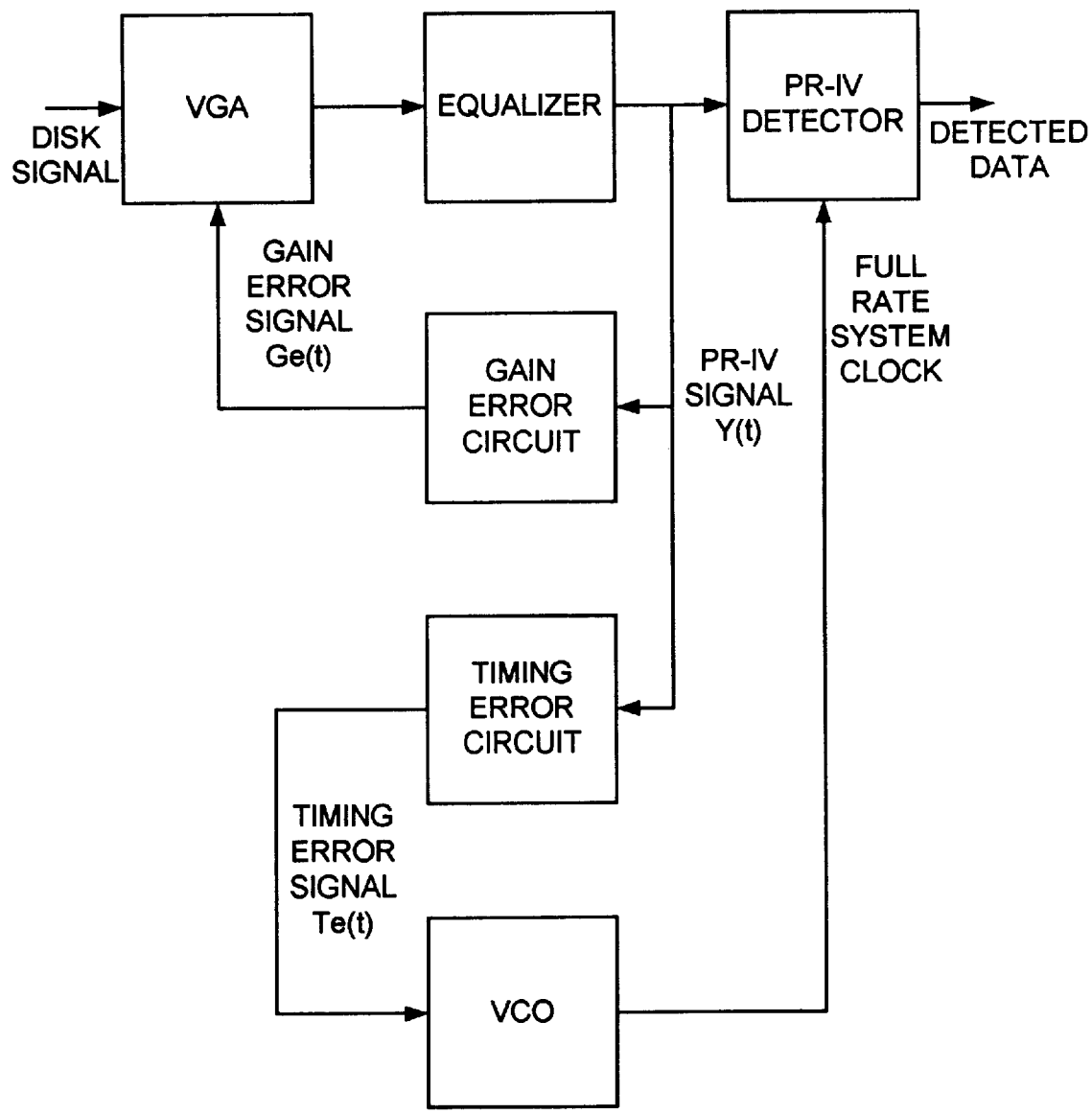
FIG. 2 is a block diagram of a prior art PRML data channel.

Referring now to the drawings, in FIG. 1 there is illustrated a direct access data storage device (DASD) generally designated as 100 including a stack 102 of disks 104 each having at least one magnetic surface 106. The disks 104 are mounted parallel to one another for simultaneous rotation on and by an integrated spindle and motor assembly 108. Information on each magnetic disk surface 106 is read from or written to the disk surface 106 by a corresponding transducer head assembly 110 movable in a path having a radial component across the rotating disk surface 106.

Each transducer head assembly 110 is carried by an arm 112. The arms 112 are ganged together for simultaneous pivotal movement by a voice coil motor (VCM) magnet assembly 114. Drive signals applied to the VCM magnet assembly 114 cause the arms 112 to move in unison to position the transducer head assemblies 110 in registration with information storage tracks on the disk surfaces 106 where information is written or read. As shown in FIG. 1, an electronics card 116 is mounted together with a base support 118 of DASD 100. The utility of the present invention is not restricted to the details of a particular DASD construction.

In accordance with features of the invention, an interleaving technique is used in tracking timing and gain feedback control loops for data detection.

Figure 3:
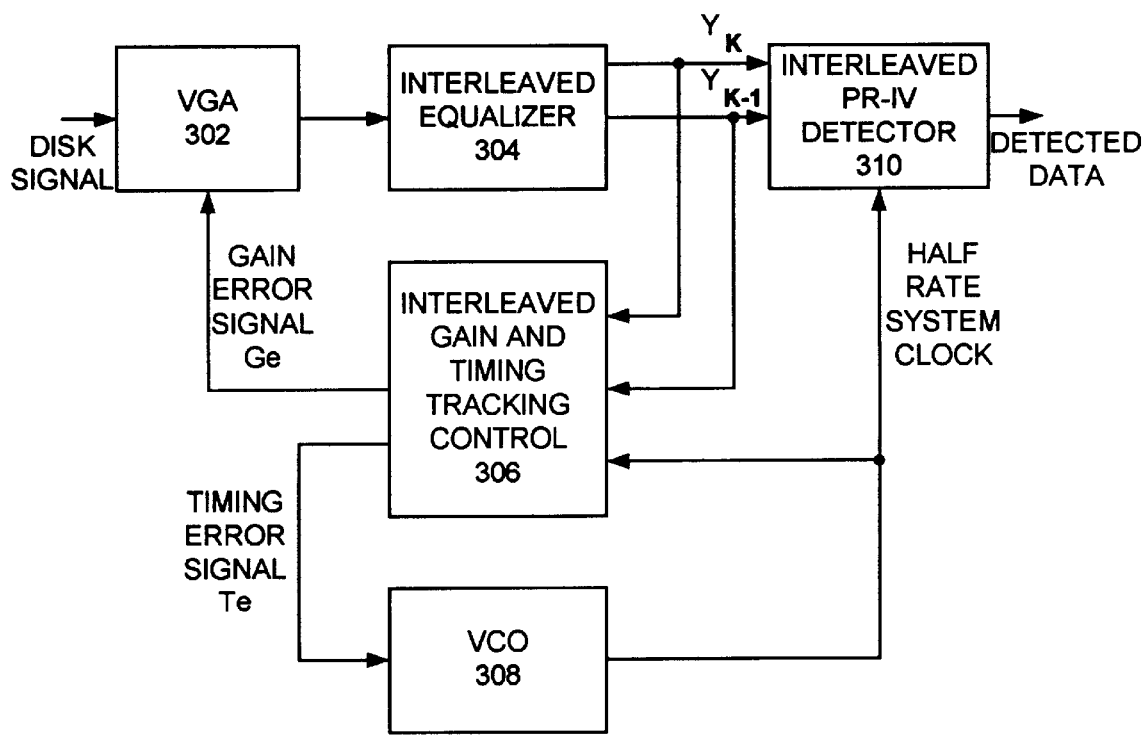
FIG. 3 is a block diagram of a data channel of the direct access storage device (DASD) of FIG. 1 embodying the present invention.

Referring now to FIG. 3, a data channel generally designated as 300 of the direct access storage device (DASD) 100 embodying the present invention is shown. A read signal is applied to a variable gain amplifier (VGA) 302 and the amplified read signal is applied to an interleaved equalizer 304. The interleaved equalizer 304 produces dual interleave signals $Y_k$, $Y_{k-1}$. With partial response (PR) Class-IV signal processing, signal detection can be provided on an interleave basis. Odd samples and even samples are independently processed for data detection. In accordance with features of the invention, the interleaved equalizer 304 and an interleaved gain and timing tracking control 302 of the preferred embodiment advantageously operate at one-half bit or clock rate, allowing a very high speed maximum possible data rate.

A voltage controlled oscillator (VCO) 308 provides a half rate system clock to the interleaved equalizer 304, the interleaved gain and timing tracking control 306 and a detector 310. The equalized signals from the interleaved equalizer 304 can be a class IV partial response (PR4) signal or other data detection signal 20 that can be processed on an interleaved basis. The interleaved signals Yk, $Y_{k-1}$ are applied to the detector 310 to complete the detection process for data read back.

The interleaved gain and timing tracking control 302 of the preferred embodiment produces a timing error signal $T_e$ applied to the VCO 308 and a gain error signal $G_e$ applied to the VGA 302. The interleaved gain and timing tracking control 302 of the preferred embodiment receives the two interleaved signals $Y_k$, $Y_{k-1}$. The interleave $Y_{k-1}$ uses odd samples and the other interleave Yk uses even samples. The two signals Yk, $Y_{k-1}$ coming into the interleaved gain and timing tracking control 302 are synchronous. The interleaved gain and timing tracking control 302 can use the signals Yk, $Y_{k-1}$ arriving at the same half rate bit cycle. $Y_{k-1}$ is the signal that is delayed one full rate clock cycle from $Y_k$.

Figure 4:
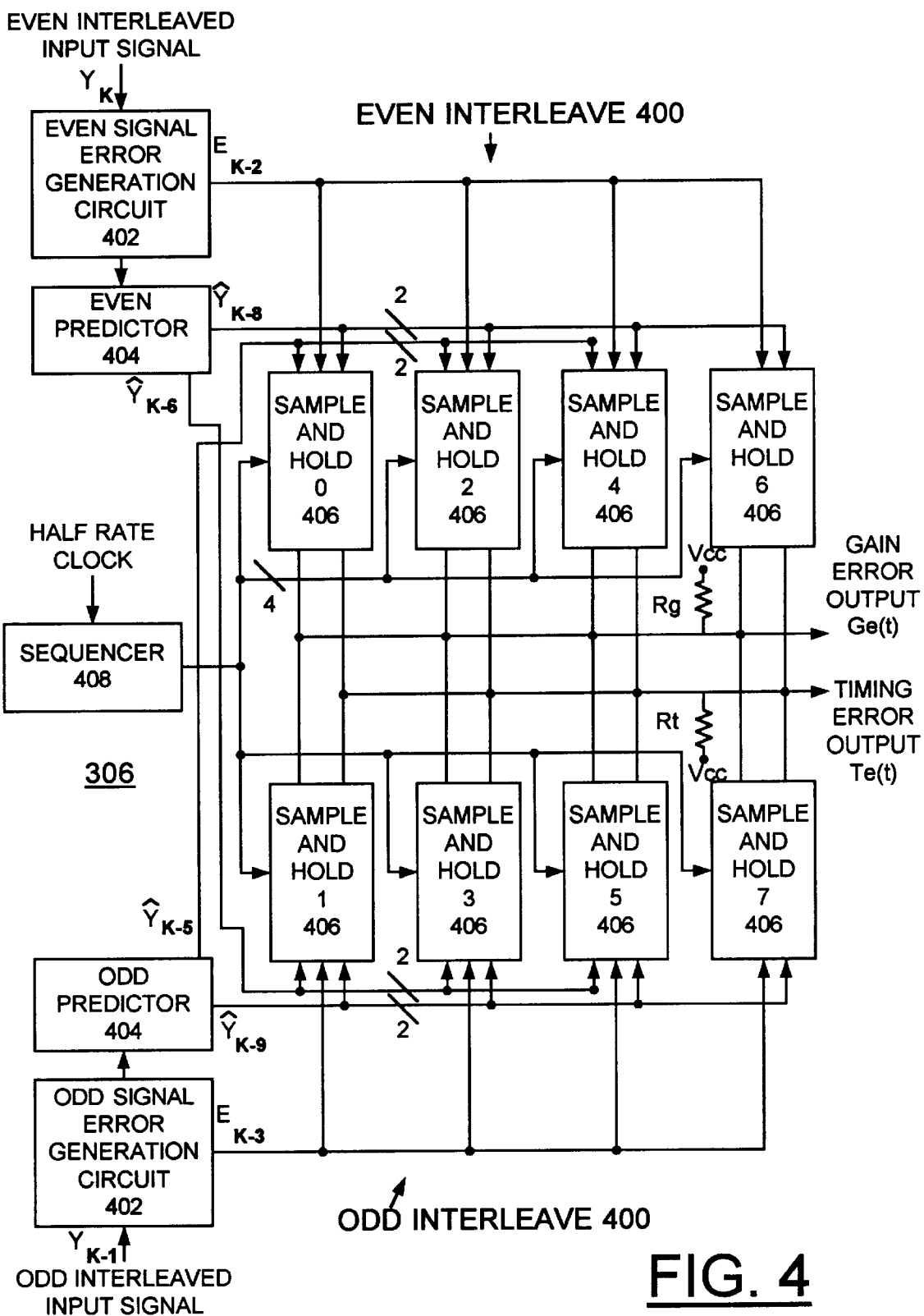
FIG. 4 is a schematic and block diagram representation of an interleaved gain and timing error circuit in accordance with the present invention.

FIG. 4 illustrates the interleaved gain and timing error circuit 306 in accordance with the present invention. The gain error signal algorithm equation for interleaving of the invention is represented by:

$$G_e = G_{odd} + G_{even}$$

where odd and even indicate the odd and even interleaves of the sampled data. The even interleave gain error signal is represented by:

$$G_{even} = \ddot{Y}_{k-8}(E_{k-8})$$

where $\ddot{Y}_{k-8}$ is the predictor value and $E_{k-8}$ is the error signal on a given sample and hold from the ideal PR-IV target values at time k-8. similarly the odd interleave gain error signal is represented by:

$$G_{odd} = \ddot{Y}_{k-9}(E_{k-9})$$

Together the odd and even interleave gain error signals, $G_{odd}$ and $G_{even}$ are summed together to provide the total gain error $G_e$.

The timing error signal algorithm equations of the invention for interleaving are represented by:

$$T_e = T_{odd} + T_{even}$$

$$T_{odd} = \ddot{Y}_{k-6}(E_{k-7} - E_{k-5})$$

$$T_{even} = \ddot{Y}_{k-5}(E_{k-6} - E_{k-4})$$

Just as in the gain error algorithm the timing error algorithm is summed between the two interleaves. Notice $T_{odd}$ is a result of $E_{k-7}$ minus $E_{k-5}$ which are from the odd interleave, but $\ddot{Y}_{k-6}$ is a predictor value from the even interleave. Likewise the $T_{even}$ signal is uses $\ddot{Y}_{k-5}$ which is the predictor value from the odd interleave. This is not a problem since the predictor from the opposite interleave is a valid prediction of whether the timing error needs to be multiplied by +1, -1 or 0.

In FIG. 4, the interleaved analog gain and timing error circuit 302 includes two separate interleaves 400, generally designated as EVEN INTERLEAVE 400 and ODD INTERLEAVE 400. The even interleave 400 includes an even error generation circuit 402, an even predictor 404 and a plurality of even sample and holds (S/H) (0, 2, 4, 6) 406. The odd interleave 400 includes an odd error generation circuit 402, an odd predictor 404 and a plurality of odd sample and holds (1, 3, 5, 7) 406. One sequencer circuit 408 clocks both the even and odd interleaves 400 at the half clock rate. The even and odd error generation circuits 402 respectively generate the error signal values $E_{k-2}$, $E_{k-3}$. The error signal values $E_{k-2}$, $E_{k-3}$ represent the amounts by which the interleaved sampled values $Y_k$, $Y_{k-1}$ differ from the target values, such as the target values of +1, 0 -1 for PR-IV data signals. The even and odd predictors generate values representing one of the target values of +1, 0 or -1 for the interleaved sampled values $Y_k$, $Y_{k-1}$. The predictor values of $\ddot{Y}_{k-5}$, $\ddot{Y}_{k-6}$, $\ddot{Y}_{k-8}$, $\ddot{Y}_{k-9}$ are, for example, two bit digital values representing one of the target values of +1, 0 or -1. The respective sample and holds 406 store respective error signals from the even and odd error generation circuits 402. $G_e$ is the gain error voltage output that results from the output currents from the sample and holds dotting into a resistor Rg. $T_e$ is the timing error voltage output that results from the output currents from the sample and holds dotting into a resistor Rt.

The even interleave signal $Y_k$ is applied to the even signal error generation circuit 402. The output of the signal error generation circuit is a voltage difference from the ideal PR-IV target voltage and is denoted as $E_{k-2}$. $E_{k-2}$ is then sampled by one of the four even interleave sample and holds (0, 2, 4 or 6) 406. The outputs of the sample and holds advantageously are current outputs rather than voltage outputs, so that the held output can be dotted to add linearly, as shown in FIG. 4. Once $E_{k-2}$ is sampled and held it will be used for the next 3 half clock cycles to realize the timing and gain equations described above.

FIGS. 5 and 6 are charts respectively illustrating even interleave sequencing and odd interleave sequencing in the interleaved analog gain and timing error circuit 302. The time sequence is denoted as k-n where n is an even integer. For example at time k-10, FIG. 5 shows that sample and hold 0 will output a current representing $E_{k-6}$, sample and hold 2 will output a current representing $E_{k-8}$, sample and hold 4 will be tracking the output voltage from the signal error generation circuit and will not output a current during this clock period, and sample and hold 6 will output a current representing $E_{k-4}$. On the next clock cycle, k-8, the sequencer rotates the sample and holds as shown in FIG. 5.

The odd interleave signal $Y_{k-1}$ is applied to the even signal error generation circuit 402. The output of the signal error generation circuit 402 is a voltage difference from the ideal PR-IV target voltage and is denoted as $E_{k-3}$. $E_{k-3}$ is then be sampled by one of the four odd interleave sample and holds (1, 3, 5 or 7) 406. Once $E_{k-3}$ is sampled and held, it is used for the next 3 half clock cycles to realize the timing and gain equations described above.

FIG. 6 shows the odd interleave sequences. The time sequence is denoted as k-n where n is an even integer. For example at time k-10, FIG. 6 shows that sample and hold 1 will output a current representing $E_{k-7}$, sample and hold 3 will output a current representing $E_{k-9}$, sample and hold 5 will be tracking the output voltage from the signal error generation circuit and will not output a current during this clock period, and sample and hold 7 will output a current representing $E_{k-5}$. On the next clock cycle, k-8, the sequencer rotates the sample and hold as shown in FIG. 6.

To complete the timing and gain algorithms, delayed versions of the predictor values from even and odd interleaves are needed to fully realize the equation Ge and Te. The predictor values from the even interleave predictor 404 are $\ddot{Y}_{k-6}$ And $\ddot{Y}_{k-8}$. The predictor values from the odd interleave predictor 404 are $\ddot{Y}_{k-5}$ and $\ddot{Y}_{k-9}$. These predictor values are delayed versions of the predicted PR-IV target values from the both interleave signals Yk and Yk-1.

Figure 7:
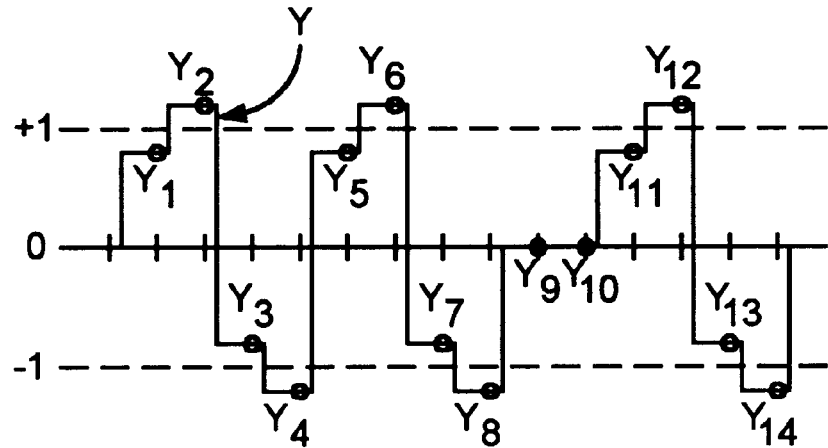
FIGS. 7 and 8 are diagrams respectively illustrating conventional non-interleaved partial response (PR) Class-IV data and interleaved PR Class-IV data with voltage shown along the vertical axis and time shown along the horizontal axis.
Figure 8:
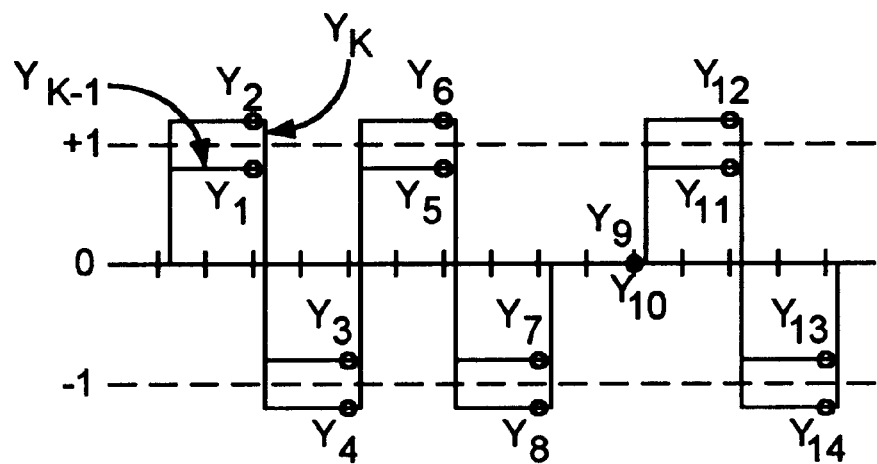

FIGS. 7 and 8 respectively illustrates conventional non-interleaved partial response (PR) Class-IV data and interleaved PR Class-IV data. From a comparison of FIGS. 7 and 8, it may be seen that the interleaved signals Yk and Yk-1 transition at half the clock speed as the non-interleaved signal Y.

Figure 9:
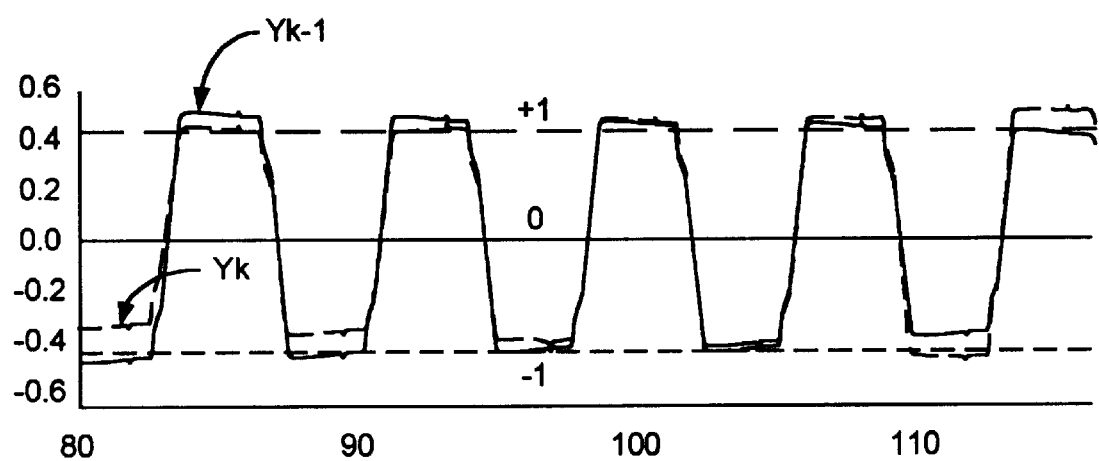
FIG. 9 is a diagram illustrating exemplary odd and even interleaved data readback signals with voltage shown along the vertical axis and time shown along the horizontal axis.

FIG. 9 illustrates an example of odd and even interleaved signals where the system clock is sampling the PR-IV signal too slow and so the timing error signal, Te, would be negative until the VCO speeds up. The half rate clock speed is for example, 4 ns. The interleave input signals Yk and Yk-1 are shown in FIG. 9 where a +1 ideal target level is +500 mV and a −1 ideal target level is −500 mV.

Figure 10:
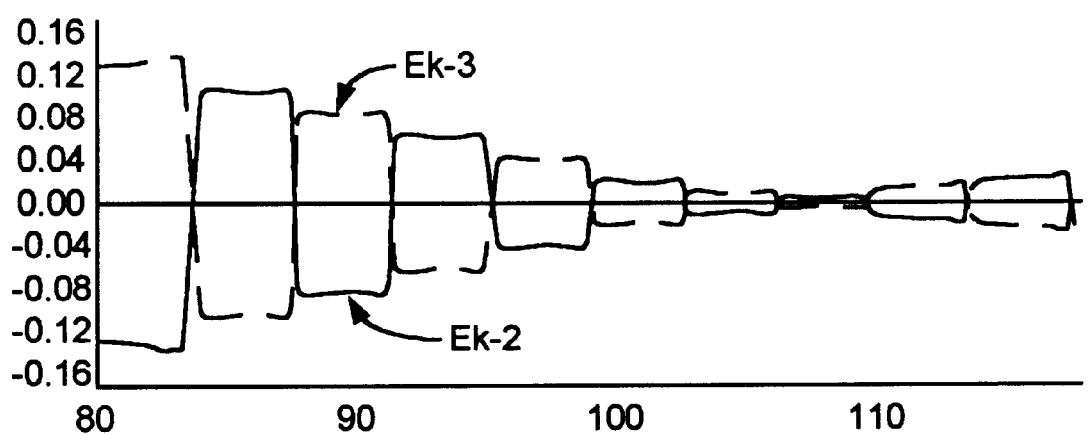
FIGS. 10 and 11 are diagrams respectively illustrating an exemplary gain error signal and an exemplary timing error signal of the interleaved gain and timing error circuit of FIG. 4 of the preferred embodiment with error magnitude shown along the vertical axis and time shown along the horizontal axis.
Figure 11:
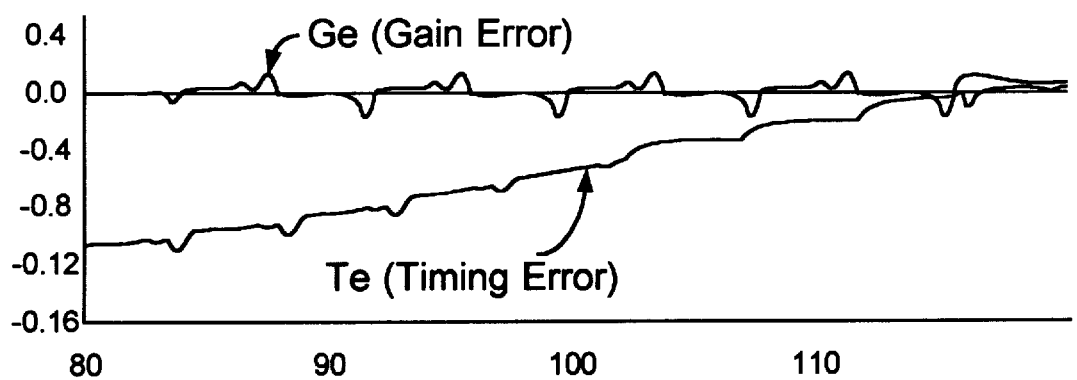

FIGS. 10 and 11 respectively illustrates an exemplary gain error signal Ge(t) and an exemplary timing error signal Te(t) of the interleaved gain and timing error circuit 302 responsive to the interleaved signals of FIG. 9. In FIG. 10, the resulting error signal voltage from the signal error generation circuit 402 is indicated by $E_{k-2}$ and $E_{k-3}$.

In FIG. 11, the timing and gain error signals Te and Ge are shown. Notice Te is negative, but slowing converges to 0 as the input interleaved signals get closer the +1 and −1 target values. Ge stays close to 0 because the average gain of the input signal is already close the +1 and −1 target values.

It should be understood that the interleaved analog gain and timing error circuit 302 of the invention in not limited to the above described algorithms. There are other algorithms that could be utilized by the interleaved analog gain and timing error circuit 302 of the invention.

While the present invention has been described with reference to the details of the embodiments of the invention shown in the drawing, these details are not intended to limit the scope of the invention as claimed in the appended claims.

What is claimed is:

1. An interleaved gain and timing tracking control circuit comprising:

a sequencer coupled to an even interleave gain and timing tracking control and an odd interleave gain and timing tracking control for clocking both said even and odd interleave gain and timing tracking controls at a half data clock rate;

said even interleave gain and timing tracking control providing an even interleave gain error signal Geven and an even interleave timing error signal Teven;

said odd interleave gain and timing tracking control providing an odd interleave gain error signal Godd and an odd interleave timing error signal Todd;

summing means for combining said even interleave gain error signal Geven and said odd interleave gain error signal Godd to provide a gain control signal Ge; where Ge=Godd+Geven; and summing means for combining said even interleave timing error signal Teven and said odd interleave timing error signal Todd to provide a timing control signal Te where Te=Todd+Teven.

2. The interleaved gain and timing tracking control circuit as recited in claim 1 wherein both said even interleave gain and timing tracking control providing said even interleave gain error signal Geven and said even interleave timing error signal Teven and said odd interleave gain and timing tracking control providing said odd interleave gain error signal Godd and said odd interleave timing error signal Todd include a plurality of sample and hold circuits, each for selectively sampling an input error signal at said half data clock rate.

3. The interleaved gain and timing tracking control circuit as recited in claim 2 wherein each said sample and hold circuit provide a current output responsive to sampling said input error signal.

4. The interleaved gain and timing tracking control circuit as recited in claim 3 wherein said summing means for combining said even interleave gain error signal Geven and said odd interleave gain error signal Godd to provide said gain control signal Ge include means coupled to each said each said sample and hold circuit for summing said current outputs.

5. The interleaved gain and timing tracking control circuit as recited in claim 3 wherein said summing means for combining said even interleave timing error signal Teven and said odd interleave timing error signal Todd to provide said timing control signal Te include means coupled to each said each said sample and hold circuit for summing said current outputs.

6. The interleaved gain and timing tracking control circuit as recited in claim 3 wherein said sequencer is coupled to said plurality of sample and hold circuits, said sequencer controlling each said plurality of sample and hold circuits to selectively sample said input error signal at said half data clock rate.

7. The interleaved gain and timing tracking control circuit as recited in claim 2 wherein said input error signal includes an analog error voltage signal and a digital target level representative signal.

8. The interleaved gain and timing tracking control circuit as recited in claim 1 wherein both said even interleave gain and timing tracking control and said odd interleave gain and timing tracking control include a signal error generating circuit for sampling a received interleave signal and generating an error signal.

9. A direct access storage device including a data channel comprising:
- at least one disk mounted for rotation about an axis and having at least one disk surface for storing data;
- transducer means mounted for movement across said disk surface for reading and writing data to said disk surface;
- a variable gain amplifier coupled to said transducer means for amplifying a data readback signal from said disk surface;
- a detector coupled to said variable gain amplifier for detecting a data signal from said amplified data readback signal;
- a variable clock circuit producing a periodic clock signal;
- an interleaved gain and timing tracking control circuit comprising:
- a sequencer coupled to an even interleave gain and timing tracking control and an odd interleave gain and timing tracking control for clocking both said even and odd controls at a half data clock rate;
- said even interleave gain and timing tracking control receiving an even interleave signal and providing an even interleave gain error signal Geven and an even interleave timing error signal Teven;
- said odd interleave gain and timing tracking control receiving an odd interleave signal and providing an odd interleave gain error signal Godd and an odd interleave timing error signal Todd;
- summing means for combining said even interleave gain error signal Geven and said odd interleave gain error signal Godd to provide a gain control signal Ge; said gain control signal Ge applied to said variable gain amplifier and
- summing means for combining said even interleave timing error signal Teven and said odd interleave timing error signal Todd to provide a timing control signal Te, said timing control signal Te applied to said variable clock circuit.

10. The direct access storage device as recited in claim 9 wherein both said even interleave gain and timing tracking control and said odd interleave gain and timing tracking control include a signal error generating circuit for sampling a received interleave signal and generating an error signal.

11. The direct access storage device as recited in claim 10 wherein said data readback signal includes predefined target values and wherein said error signal includes an analog error signal and a digital target level representative signal.

12. The direct access storage device as recited in claim 10 wherein both said even interleave gain and timing tracking control and said odd interleave gain and timing tracking control include a plurality of sample and hold circuits, each for selectively sampling said input error signal at said half data clock rate.

13. The direct access storage device as recited in claim 9 wherein said sequencer controls each said plurality of sample and hold circuits to selectively sample said input error signal at said half data clock rate.

14. The direct access storage device as recited in claim 9 wherein said even interleave gain error signal $G_{even}$ and said odd interleave gain error signal $G_{odd}$ are represented by:

$$G_{even} = \ddot{Y}_{k-8}(E_{k-8})$$

$$G_{odd} = \ddot{Y}_{k-9}(E_{k-9})$$

where $\ddot{Y}_{k-8}$, $\ddot{Y}_{k-9}$ are data readback signal target predictor values and $E_{k-8}$, $E_{k-9}$ are error signals on a sample.

15. The direct access storage device as recited in claim 9 wherein said odd interleave timing error signal $T_{odd}$ and said even interleave timing error signal $T_{even}$ are represented by:

$$T_{odd} = \ddot{Y}_{k-6}(E_{k-7} - E_{k-5})$$

$$T_{even} = \ddot{Y}_{k-5}(E_{k-6} - E_{k-4});$$

where $\ddot{Y}_{k-6}$, $\ddot{Y}_{k-5}$ are data readback signal target predictor values and $E_{k-7}$, $E_{k-5}$, $E_{k-6}$, $E_{k-4}$ are error signals on a sample.

16. A timing and gain feedback control method for data detection in a direct access storage device (DASD) comprising the steps of:
- providing an even interleave gain and timing tracking control and an odd interleave gain and timing tracking control and a sequencer for clocking both said even and odd interleave gain and timing tracking controls at a half data clock rate;
- utilizing said even interleave gain and timing tracking control, receiving an even interleave data signal and generating an even interleave gain error signal and an even interleave timing error signal;
- utilizing said odd interleave gain and timing tracking control, receiving an odd interleave data signal and generating an odd interleave gain error signal and an odd interleave timing error signal;

wherein said even interleave gain error signal Geven and said odd interleave gain error signal Godd are represented by:

$$Geven = \ddot{Y}k\text{-}8(Ek\text{-}8)$$

$$Godd = \ddot{Y}k\text{-}9(Ek\text{-}9)$$

where $\ddot{Y}k\text{-}8$, $\ddot{Y}\text{-}9$ are data readback signal target predictor values and $Ek\text{-}8$, $Ek\text{-}9$ are error signals on a sample;

$$Todd = \ddot{Y}k\text{-}6(Ek\text{-}7 - Ek\text{-}5)$$

$$Teven = \ddot{Y}k\text{-}5(Ek\text{-}6 - Ek\text{-}4);$$

where $\ddot{Y}k\text{-}6$, $\ddot{Y}k\text{-}5$ are data readback signal target predictor values and $Ek\text{-}7$, $Ek\text{-}5$, $Ek\text{-}6$, $Ek\text{-}4$ are error signals on a sample;
- summing said even interleave gain error signal Geven and said odd interleave gain error signal Godd to provide a gain control signal Ge; where Ge=Godd+Geven; and
- summing said even interleave timing error signal and said odd interleave timing error signal to provide a timing control signal Te; where Te=Todd+Teven.

* * * * *